(No Model.) 6 Sheets—Sheet 1.

G. A. OHL.
MASH TUB.

No. 393,851. Patented Dec. 4, 1888.

WITNESSES:
J. L. Bartine
Wm. E. Bluett

INVENTOR.
George A. Ohl,
BY Campbell & Co. ATT'YS.

(No Model.) 6 Sheets—Sheet 3.
G. A. OHL.
MASH TUB.
No. 393,851. Patented Dec. 4, 1888.
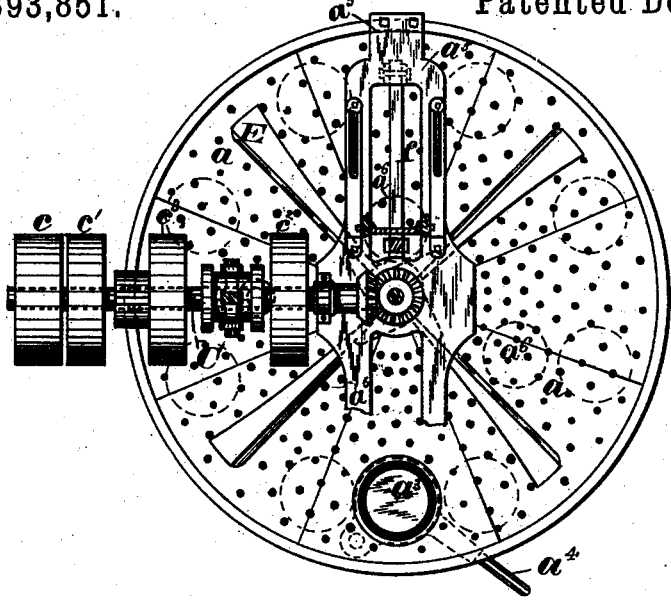
*Fig. 3*
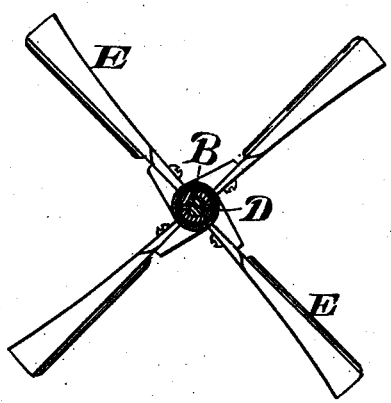
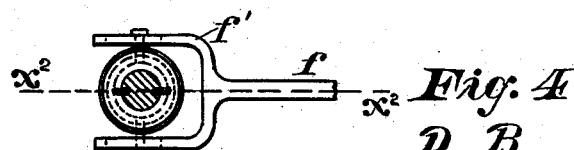
*Fig. 6*    *Fig. 5*
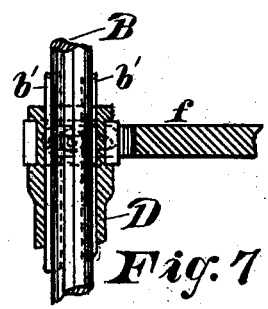
*Fig. 7*
WITNESSES:
INVENTOR,
George A. Ohl,
BY Campbell & Co ATT'YS.

(No Model.) 6 Sheets—Sheet 4.

G. A. OHL.
MASH TUB.

No. 393,851. Patented Dec. 4, 1888.

WITNESSES:
J. L. Bartine.
Wm. E. Blewett.

INVENTOR·
George A. Ohl.
BY Campbell & Co. ATT'YS.

(No Model.) 6 Sheets—Sheet 5.
G. A. OHL.
MASH TUB.
No. 393,851. Patented Dec. 4, 1888.
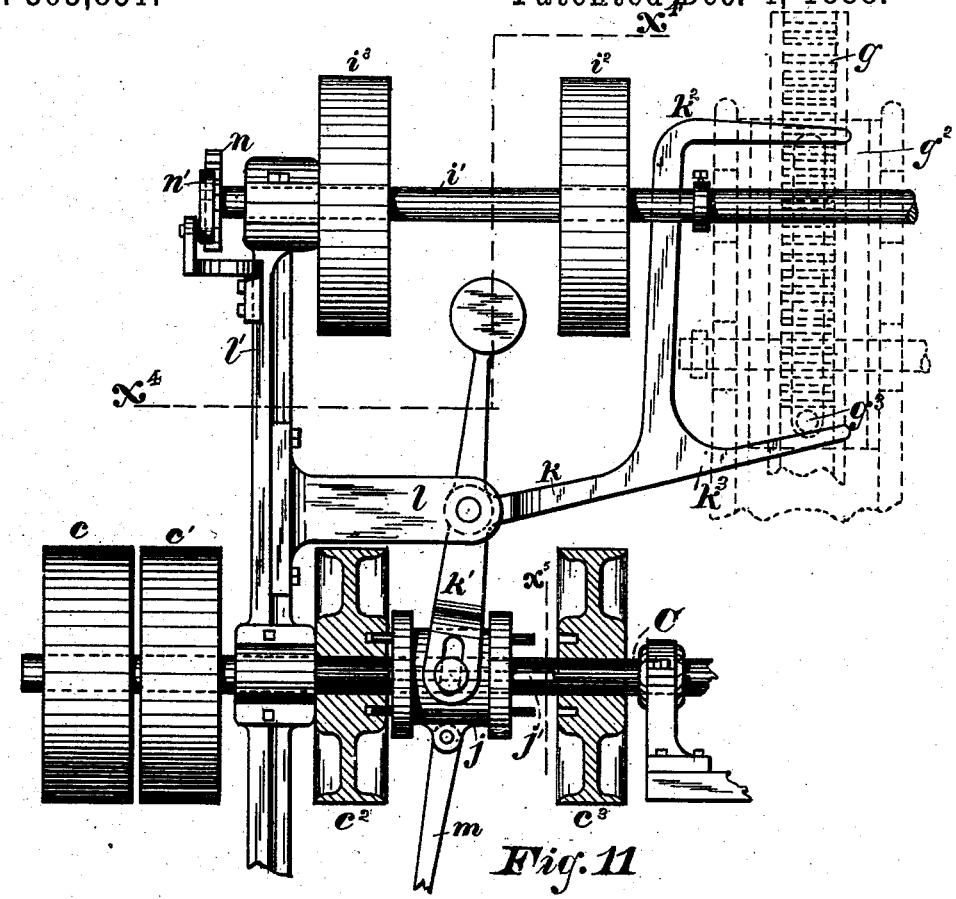
Fig. 11
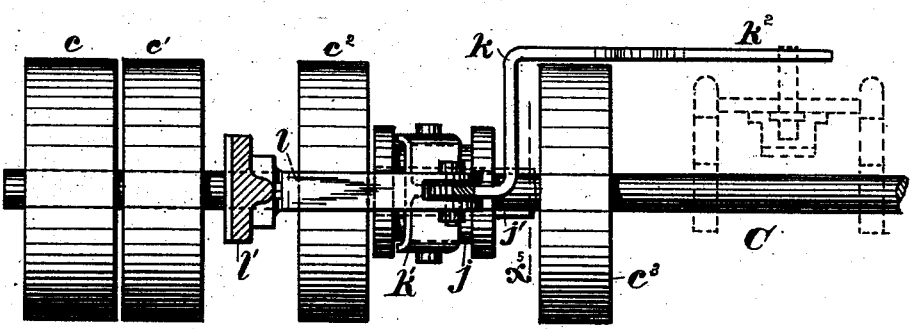
Fig. 12
Fig. 13
WITNESSES:
J. H. Bartine
Wm. E. Blewitt
INVENTOR:
George A. Ohl
BY Campbell & Co. ATT'YS.

(No Model.) 6 Sheets—Sheet 6.
G. A. OHL.
MASH TUB.
No. 393,851. Patented Dec. 4, 1888.
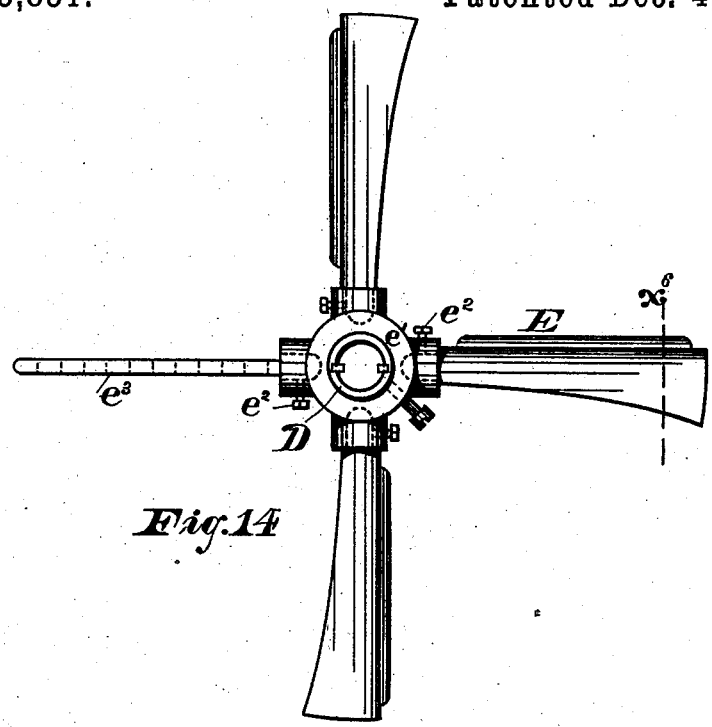
Fig. 14
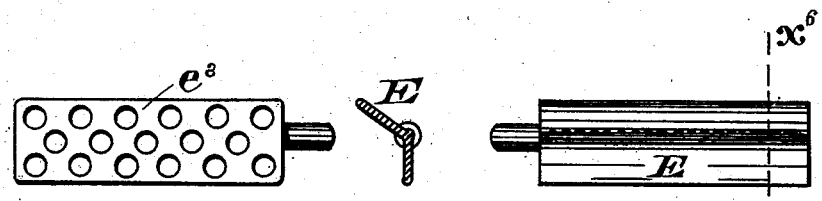
Fig. 16  Fig. 15  Fig. 17
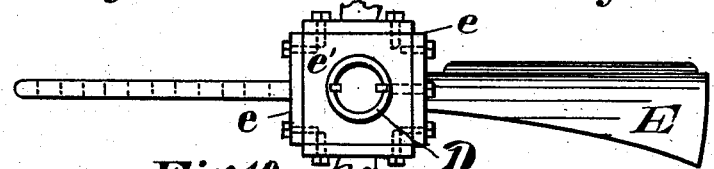
Fig. 18
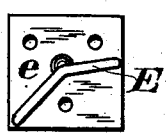 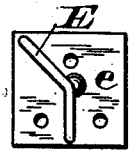 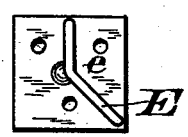
Fig. 20  Fig. 19  Fig. 21
WITNESSES: INVENTOR.
George A. Ohl
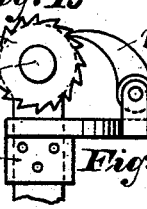
Fig. 22 BY Campbell & Co. ATT'YS.

UNITED STATES PATENT OFFICE.

GEORGE A. OHL, OF NEWARK, NEW JERSEY.

MASH-TUB.

SPECIFICATION forming part of Letters Patent No. 393,851, dated December 4, 1888.

Application filed September 29, 1886. Serial No. 214,817. (No model.)

*To all whom it may concern:*

Be it known that I, GEORGE A. OHL, a citizen of the United States, residing at Newark, in the county of Essex and State of New Jersey, have invented certain new and useful Improvements in Mash-Tubs; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in machines employed in mashing the malted grain in the manufacture of beer, &c., in which operation the saccharine principle is extracted previous to the addition of the hops and the fermentation of the hopped worts.

The machine is primarily designed to enable the workman to have more perfect control of the mash in the tun, so that the entire mass may be thoroughly stirred from the top to the bottom thereof, and when the worts have been expressed to readily and with an expenditure of but comparatively little power throw out the grains or malt-dust from the tun.

In addition to these objects the invention is intended, by means of improved mechanical constructions and operations, to so act upon the mash as to extract a much larger percentage of sugar from the malted grain than has been done by means of those machines heretofore employed.

In the accompanying drawings, embodied in six sheets, is illustrated the improved mashing-machine, in which are shown certain old features together with what is novel.

Figure 1:
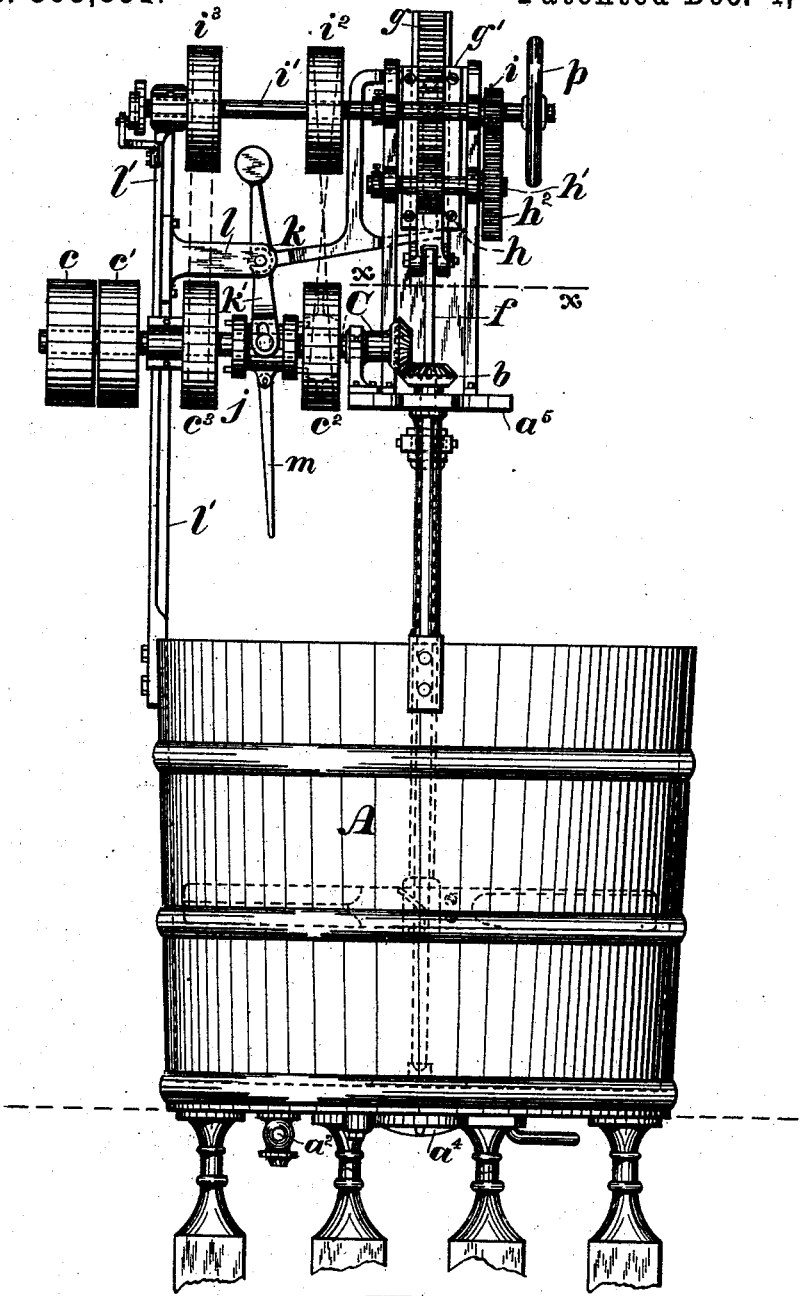
Figure 2:
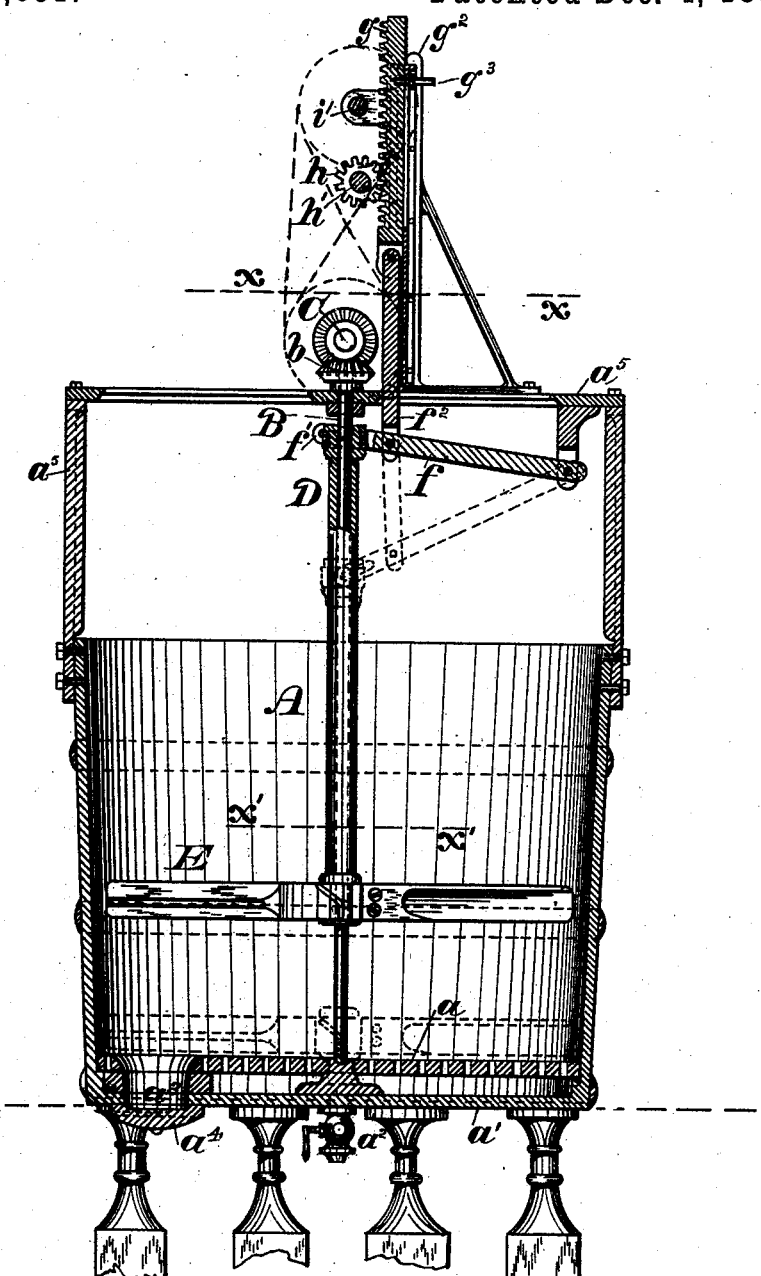
Figures 8, 9:
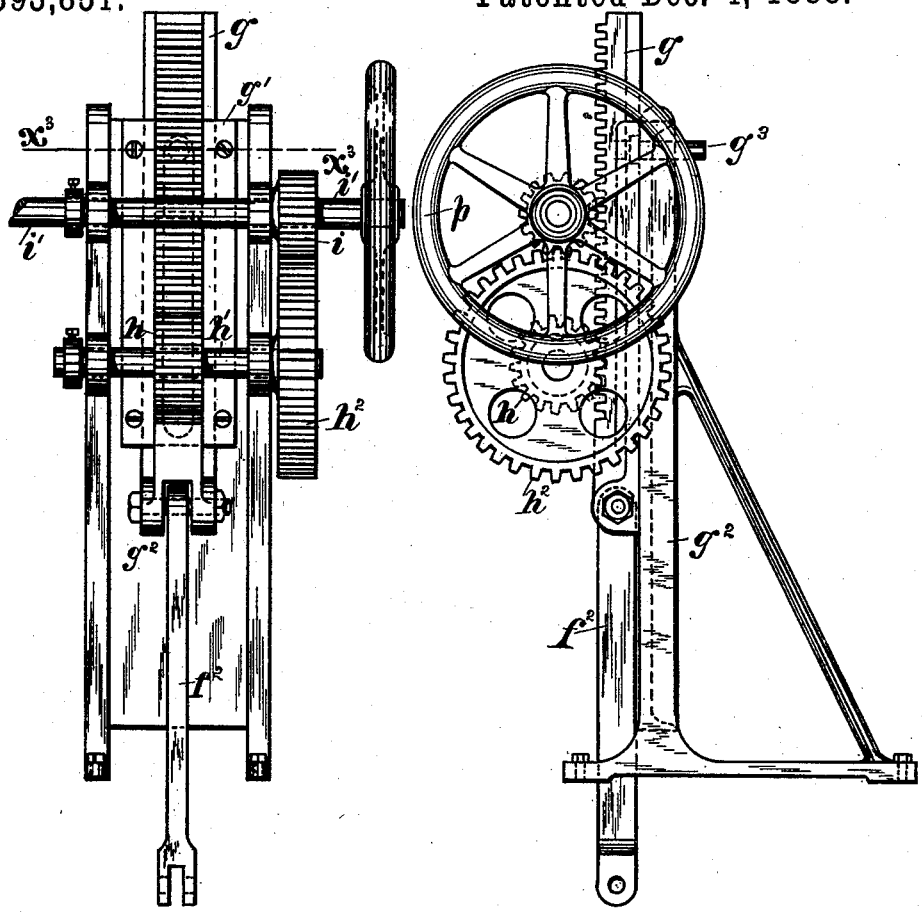
Figure 10:
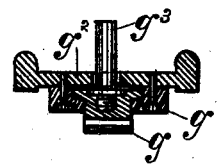

Of the views in said drawings, Figure 1 is a front elevation of the mashing-tun and mashing mechanism. Fig. 2 is a vertical section taken from front to rear of Fig. 1. Fig. 3 is a sectional view taken through line $x$, Fig. 1, all of the parts beneath said line being in plan. Fig. 4 is a plan of the agitators or stirring-paddles, the shaft being in section. Fig. 5 is a transverse section taken through said shaft on the line $x'$, Fig. 2. Fig. 6 is a cross-section of the paddle-actuating or vertical shaft, taken above the bifurcated lever; and Fig. 7 is a vertical section of the upper portion of the sliding paddle tube or collar through $x^2$, Fig. 6. On Sheet 4, Figs. 8 and 9 are enlarged front and side elevations, respectively, of the reciprocating rack and pinion, a portion of the mechanism for raising and lowering the paddles. Fig. 10 is a section taken through $x^3$, Fig. 8. Fig. 11, Sheet 5, is a front elevation of the mechanism for raising and lowering the paddles and operating the paddle-actuating shaft. Fig. 12 is a view, partly in plan and in section, taken through line $x^4$ in Fig. 11; and Fig. 13 is a section of the main shaft at the point upon which the sliding clutch moves, taken through $x^5$, Fig. 12. Fig. 14, Sheet 6, is a plan of one form of paddles, illustrating the construction by means of which they may be adjusted. Fig. 15 is a section of one of said paddles through $x^6$, Figs. 14 and 17. Figs. 16 and 17 are a side elevation and top view, respectively, of forms of paddles shown in Fig. 14. Fig. 18 is a view similar to Fig. 14, two of the paddles being broken off, illustrating a modified method of securing the paddles. Figs. 19, 20, and 21 illustrate different ways of setting or forming the paddle blades or wings, and Fig. 22 is a side elevation of the mechanism for retaining the paddles in any given position.

In all of said views similar letters of reference are employed to indicate corresponding parts in each of the views.

In mashing-machines as heretofore constructed the mash is not as effectively stirred, owing to the defective mechanical construction thereof, as it should be to extract the largest proportion of sugar which should be expressed from a given quantity of malt. Moreover, owing to the fact that the agitators are constantly in the mash, it manifestly requires a great amount of power to start the revolution of the agitator in the mash.

In my improved machine the paddles are so arranged and operated that they may revolve at the bottom of the mash, or at or above the top thereof, or at any intermediate point therebetween; or said paddles may move automatically up and down through the mash, moving and turning in a spiral direction therein.

The mechanism shown in the various views of the drawings is adapted to perform these several functions, and consists of a mash-tun, A, provided with a double bottom, the upper one, $a$, being perforated to permit the outflow of the worts into the space between the same, the lower one, $a'$, having a cock or valve, $a^2$, through which the worts may be drawn for the next step in the process. An opening, $a^3$, extending through both bottoms and closed on the outside by a pivoted or hinged gate, $a^4$, is provided, through which the malt-dust is swept out of the tun by the rotating paddles after all of the worts has been expressed therefrom.

Within the mash-tun is arranged a paddle-actuating shaft, B, turning in a suitable plate or bearing on the bottom of the tun, and provided on its upper end with a gear-wheel, $b$, which meshes with a second gear-wheel on the main shaft C. Turning with the paddle-actuating shaft and sliding freely up and down thereon is an elongated collar or tube, D, to the lower end of which the paddles or agitators E are attached, rotating with the tube as said tube is caused to turn with the shaft B. To permit said sliding movement of the tube and cause said tube to turn with the shaft, said shaft is provided with one or more splines, $b'$, which fit in grooves in the said tube, as indicated in Figs. 5 and 6.

As above stated, the rotary motion of the paddle-actuating shaft and the parts connected therewith is communicated thereto through the main shaft C, which, as shown, is provided with suitable driving-pulleys, $c\ c'$.

For producing the automatic raising and lowering of the paddles simultaneously with the rotary motion thereof, or independently of said rotary motion of the paddles, if need be, I have devised the mechanism shown in the several figures of the drawings, but do not wish to limit the invention thereto, as mechanical equivalents of which I am aware may be substituted therefor to produce the desired result. As illustrated, said mechanism consists of a lever, $f$, pivotally attached at one end to the frame $a^5$ above the tun, or to any convenient point, and at the bifurcated end $f'$, also pivotally connected with the top of the tube D, as in Figs. 2, 6, and 7, and connected with said lever $f$ by a link, $f^2$, is a reciprocally-moving rack, $g$, sliding in ways $g'$, which are secured to the slotted upright $g^2$, Fig. 10. The vertical reciprocating movement of the said rack is produced by the rotation of the pinion $h$ on the shaft $h'$, Figs. 1, 2, 8, and 9, which is provided with a spur-wheel, $h^2$, meshing with a second pinion, $i$, on the shaft $i'$, which extends across the rack and over the main shaft, or may be otherwise suitably arranged. On said shaft $i'$ are arranged two fast pulleys, $i^2\ i^3$, which are connected with the loose pulleys $c^2\ c^3$ by belts, as dotted on Figs. 1 and 2, a cross-belt connecting the pulleys $c^2$ and $i^2$ and transmitting the motion of the driving-shaft to the rack through the shafting and gearing above described, to cause a downward movement of said rack and the sliding paddle-tube and paddles connected therewith, and the straight belt connecting the pulleys $c^3$ and $i^3$, communicating the movement of the said driving-shaft through the same shafting and gearing to said rack, to cause the upward movement thereof and the attached parts. To transmit the motion of the driving-shaft to said loose pulleys, a clutch of any approved construction may be used, that shown for illustration consisting of a sliding collar, $j$, moving on splines $j'$ on the shaft and provided with pins, which enter openings in the hubs of the pulleys, as shown in Fig. 17.

In order that the operation of the raising and lowering mechanism may be automatic, the devices shown more particularly in Figs. 11 and 12 are employed to accomplish the desired end. Said devices consist of a lever, $k$, pivoted to an arm, $l$, projecting from the standard $l'$, one end, $k'$, of said lever being bifurcated and slotted to engage with suitable pins on the sliding clutch, the other end of said lever being formed substantially as indicated in Fig. 17, having arms $k^2\ k^3$ placed at some distance apart. Between said arms moves a pin, $g^3$, projecting from the back of the rack through a slot in the standard $g^2$, as shown in Fig. 10, said pin striking each of said arms alternately at each end of the reciprocating movement of the rack.

As indicated in Figs. 1 and 2, the rack has just completed its upward movement and the pin in striking the arm $k^2$ disengages the clutch from the pulley $c^3$ and throws the same into engagement with the pulley $c^2$, which causes the rack to descend. When the rack has reached its lowest point, the pin strikes the lower arm, $k^3$, and changes the clutch from the pulley $c^2$ back to the pulley $c^3$, and the rack in consequence moves upward. Thus it will be apparent that a repetition of these operations causes the automatic ascent and descent of the rack and its connecting parts.

Should it be necessary to allow the paddles to rotate for a considerable time at the bottom of the mash-tun, the clutch may be disengaged from both of the loose pulleys by means of the hand-lever $m$, Fig. 1, thus freeing the clutch from both of said pulleys and preventing any movement of the rack. On the other hand, if at any time it should be desirable to continue the revolution of the said paddles at any intermediate point between the extremes of the movement of the rack, or above the surface of the mash in the tun, I have provided a ratchet and detent, $n\ n'$, Figs. 11 and 22, placed on the end of the shaft $i$, or at any suitable point, to lock the said shaft and hold the rack immovable. When thus locked, the clutch is thrown away from both pulleys $c^2\ c^3$, as will be understood.

As thus constructed and operated the continuous revolution of the main shaft causes a constant rotary motion of the paddles or agitator, and simultaneously therewith the same movement of the main shaft through the mechanism above described causes the raising and lowering of said paddles. The advantage of this will be apparent from the fact that when the malted grain has been poured into the tun in sufficient quantity to cover the paddles it requires a great deal of power to start the revolution thereof, owing to the resistance offered by the mass of grain; but by raising the paddles above the surface of the grain and starting them while thus elevated the full power can be applied at once, so that when the paddles begin to move downward they may enter the grain at their full speed and power, and thus readily work their way downward until the lowest point is reached, when they return upward through the mash, stirring and agitating the entire mass most effectively during the repeated upward and downward movements.

When the malt has been thoroughly mashed and all of the worts extracted therefrom, the gate $a^4$ is opened and the malt-dust is swept out of the tun through the opening $a^3$ by the same rotary movement of the fans or paddles which effects the extraction of the worts. In order to facilitate the expulsion of the malt-dust from the tun, a series of said openings $a^3$ may be formed through the double bottom of said tun and arranged in a spiral line around the center thereof, as indicated by the dotted circles $a^6$, Fig. 3, so that as the fans revolve every part thereof passes over an opening during a single revolution of each of said fans. The effect of the openings is the same as if a slot were cut from the center to the periphery of the bottom of the tun, through which all of the malt-dust may be expelled. The advantage, however, of arranging the slots or openings at intervals is, that the bottom of the tun is not weakened thereby, and that the interior space between the bottoms is not obstructed as much as it would be if a continuous radial opening or slot were employed.

To render the fans or paddles of the agitator more effective in mashing the grain, they are so set that they exert their greatest force upon the mash, being either cast internally with a plate, $e$, Figs. 18 to 21, inclusive, which plate is suitably bolted to a hub, $e'$, Fig. 18, or said fans may be so constructed as to be adjusted or set at any angle, as may be necessary, by means of a set-screw, $e^2$, as indicated in Fig. 14.

As shown on Sheet 6, the fans are preferably angularly formed, so that they are more effective in stirring and mashing the grain. In Fig. 16 is illustrated a form of fan, $e^3$, provided with openings or perforations therein, which act to loosen and separate the compressed masses of grain which the solid fans, because of the pressure they exert, have a tendency to form.

In lieu of employing the power from the main shaft or using steam or other motive power, the rack may be raised and lowered by hand, a wheel or crank, $p$, Figs. 1 and 9, being attached to the shaft $i'$ for that purpose.

As I am aware that several devices have been invented for raising and lowering the paddles out of and down within the tun, I do not lay broad claim to any mechanism for accomplishing this end. In said devices, however, the mechanism for effecting this result is arranged within the mash-tun, and when in operation is surrounded by the mash in the tun, and hence is liable to clog up and become inoperative. This is avoided by my construction and arrangement by elevating the lifting mechanism above the tun and connecting the same by the sliding tube, the periphery of which is smooth and readily moves through the grain.

Having thus described my invention, I desire to claim the following:

1. In a mashing-machine, in combination, a mash-tun, a shaft arranged centrally and vertically therein, a driving-shaft provided with loose pulleys and a rotary sliding clutch thereon, gearing communicating the movement of said driving-shaft to the vertical shaft, a sliding tube moving and turning with said vertical shaft, rotating mash-agitators secured to and turning with said sliding tube, a reciprocating rack connecting with and imparting its motion to said sliding tube, a counter-shaft provided with fast pulleys thereon, gearing communicating the motion of said counter-shaft to the rack, straight and cross belts connecting said loose and fast pulleys, and a pivoted lever, one arm of which is attached to said clutch, the other end of said lever being provided with arms $k^2$ $k^3$, between which the pin projecting from the sliding rack moves and with which it engages, substantially as and for the purposes set forth.

2. In a mashing-machine, the combination of a mash-tun, an agitator and means for rotating the same, a tube to which said agitator is attached on the actuating-shaft, and means whereby it may slide thereon and receive a rotary motion therefrom, a driving-shaft connected with said actuating-shaft, a sliding rack arranged above and outside of the mash-tun and connected with the aforesaid driving-shaft and tube, as described, means by which the driving-shaft causes the tube to reciprocate and rotate simultaneously, and means by which said rack and tube are held at various points of elevation, for the purposes set forth.

3. A mashing-tun provided with a series of openings, through which the malt-dust is expelled, said openings being disposed spirally around the center of the tub, which, if arranged in a straight radial line, would form a continuous opening extending from the center to the periphery of said tun, for the purposes set forth.

In testimony that I claim the invention set forth above I have hereunto set my hand this 20th day of September, 1886.

GEORGE A. OHL.

Witnesses:
FREDK. F. CAMPBELL,
J. L. BARTINE.